(12) United States Patent
Randall et al.

(10) Patent No.: US 10,983,142 B2
(45) Date of Patent: Apr. 20, 2021

(54) DEPASSIVATION LITHOGRAPHY BY SCANNING TUNNELING MICROSCOPY

(71) Applicant: Zyvex Labs, LLC, Richardson, TX (US)

(72) Inventors: John Randall, Richardson, TX (US); Ehud Fuchs, Plano, TX (US); James H. G. Owen, Dallas, TX (US); Joseph Lake, Plano, TX (US)

(73) Assignee: ZYVEX LABS, LLC, Richardson, TX (US)

( * ) Notice: Subject to any disclaimer, the term of this patent is extended or adjusted under 35 U.S.C. 154(b) by 0 days.

(21) Appl. No.: 16/660,543

(22) Filed: Oct. 22, 2019

(65) Prior Publication Data

US 2020/0132718 A1  Apr. 30, 2020

Related U.S. Application Data

(60) Provisional application No. 62/749,766, filed on Oct. 24, 2018.

(51) Int. Cl.
*G01Q 60/10* (2010.01)
*G01Q 80/00* (2010.01)
*G01Q 10/00* (2010.01)

(52) U.S. Cl.
CPC ............ *G01Q 60/10* (2013.01); *G01Q 10/00* (2013.01); *G01Q 80/00* (2013.01); *H01J 2237/31759* (2013.01)

(58) Field of Classification Search
CPC ........ G01Q 60/10; G01Q 10/00; G01Q 80/00; H01J 2237/31759
See application file for complete search history.

(56) References Cited

U.S. PATENT DOCUMENTS 9,329,201 B2      5/2016   Randall et al.
2015/0035522 A1  12/2015   Randall et al.
2015/0355226 A1* 12/2015   Randall .................. G01Q 80/00
                                                       850/1

FOREIGN PATENT DOCUMENTS

JP         2005-230665          9/2005

OTHER PUBLICATIONS

Snow, E.S., et al., "Fabrication of Si nanostructures with an atomic force microscope," Appl. Phys. Lett., vol. 64, No. 15, 1932 (1994), 4 pages.

(Continued)

*Primary Examiner* — Nicole M Ippolito
*Assistant Examiner* — Hanway Chang
(74) *Attorney, Agent, or Firm* — Haynes and Boone, LLP

(57) ABSTRACT

Methods, devices, and systems for forming atomically precise structures are provided. In some embodiments, the methods, devices, and systems of the present disclosure utilize a scanning tunneling microscope (STM) system to receive a sample having a surface to be patterned. The system positions a conductive tip over a pixel region of the surface. While the conductive tip remains laterally fixed relative to the surface, the system applies a bias voltage between the conductive tip and the surface such that a current between the conductive tip and the surface removes at least one atom from the pixel region. The system stops applying the voltage and current when it senses the removal of the at least one atom. The system then verifies that the at least one atom has been removed from the pixel region.

22 Claims, 8 Drawing Sheets

(56) References Cited

OTHER PUBLICATIONS

Hersam, M.C., et al., "Silicon-based Molecular Nanotechnology," Nanotechnology, vol. 11, No. 2, 70 (2000), 8 pages.

Shen, T.C., et al., "Atomic-Scale Desorption Through Electronic and Vibrational Excitation Mechanisms," Science vol. 268, 1591 (1995), 4 pages.

Miki, K., et al., "Surface preparation of Si substrates for epitaxial growth," Surface Science, vol. 406. Issues 1-3, 312 (1998), 16 pages.

Fuechsle, M., et al., "Surface gate and contact alignment for buried, atomically precise scanning tunneling microscopy-patterned devices," J. Vac. Sci.Technology. B, vol. 25, 2562 (2007), 7 pages.

Li, K., et al., "Controlled Formation of Atomic Step Morphology on Micropatterned Si (100)," J. Vac. Sci. Technol. B vol. 29, 041806 (2011), 5 pages.

Randall, J.N., et al., "Automated Scanning Tunneling Microscope Image Analysis of Si (100):H 2×1 Surfaces," Microelectronic Engineering, vol. 98,214 (2012), 4 pages.

Foley, E.T., et al., "Cryogenic UHV-STM Study of Hydrogen and Deuterium Desorption from Si(100)," Phys. Rev. Lett., vol. 80, 1336 (1998), 4 pages.

Chen, S., et al., "Patterning of sub-1 nm dangling-bond lines with atomic precision alignment on H:Si(100) surface at room temperature," Nanotechnology, vol. 23, No. 27, 275301 (2012), 8 pages.

Morten Moller et al., Automated extraction of single H atoms with STM: tip state dependency, Jan. 11, 2017, Nanotechnology 28 075302, 8 pages.

J. W. Lyding et al., Nanoscale patterning and oxidation of H-passivated Si (100)-2×1 surfaces with an ultrahigh vacuum scanning tunneling microscope, Apr. 11, 1994, Applied Physics Letters 64, 2010, 4 pages.

International Searching Authority, "International Search Report and Written Opinion" for PCT/US2019/057632, dated Feb. 7, 2020, 8 pages.

\* cited by examiner

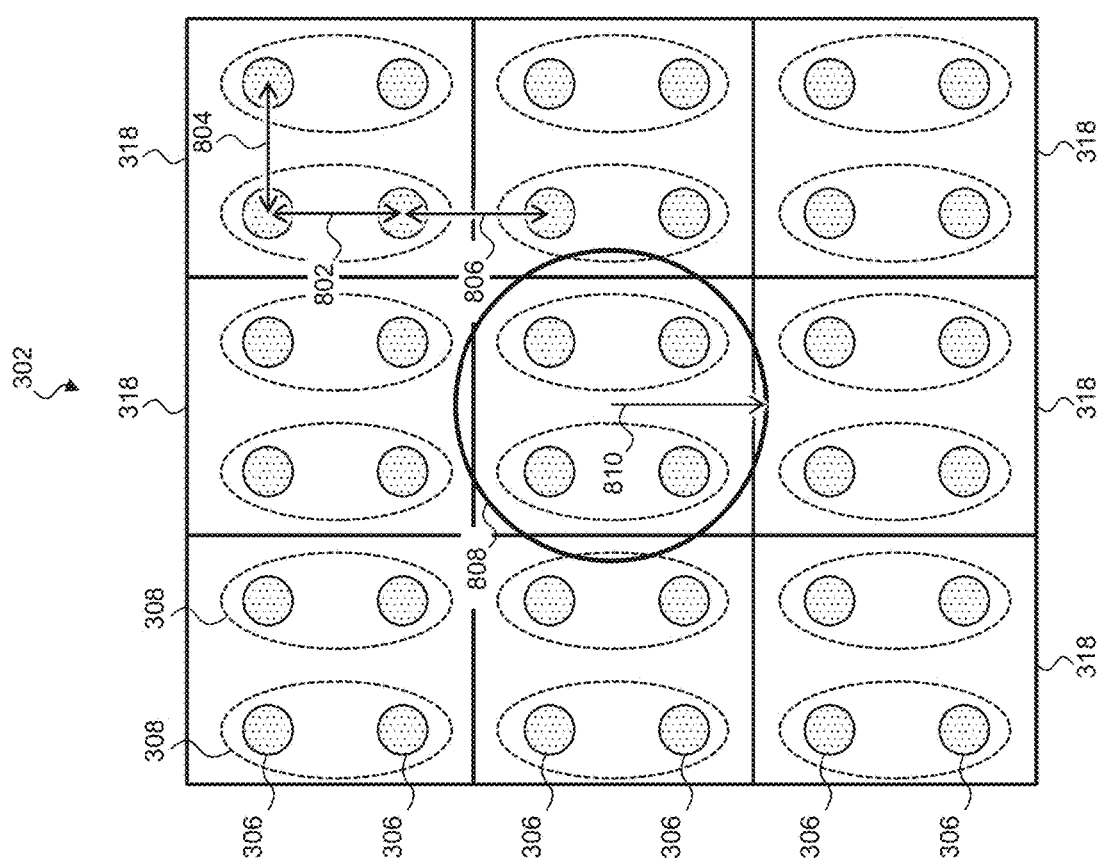

DEPASSIVATION LITHOGRAPHY BY SCANNING TUNNELING MICROSCOPY

CROSS-REFERENCE TO RELATED APPLICATIONS

The present application claims priority to and the benefit of U.S. Provisional Patent Application No. 62/749,766 filed Oct. 24, 2018, which is hereby incorporated by reference in its entirety.

TECHNICAL FIELD

The present disclosure relates to methods, devices, and systems for patterning a surface. In some embodiments, the methods, devices, and systems of the present disclosure utilize a scanning tunneling microscope (STM) to remove portions of a monolayer of atoms or molecules from a crystalline surface of a sample to form a predetermined pattern.

BACKGROUND

Scanning Tunneling Microscope (STM)

The ability to image surfaces at atomically precise levels stems from the capabilities of the STM. While there have been many different implementations since its invention in 1982, the fundamental operating principle of an STM is as follows. A conductive tip—often tungsten or platinum-iridium—that has been prepared so as to have a nanoscopic portion of the tip allows electrons to tunnel to or from the nanoscopic portion of the tip to a sample. The tip is brought in close proximity (e.g., within a few nm) to a surface of a sample. Due to the principle of quantum electron tunneling, a current flows across the gap between tip and the sample when a bias voltage is applied between the tip and the sample. The bias voltage applied between the tip and the sample can be either polarity. If the sample is negatively biased with respect to the tip, then electrons flow from the filled electronic states on the surface into the tip. If the sample is positively biased, then electrons flow from the tip into the empty electronic states of the surface. The magnitude of the bias voltage determines the surface states that are available to tunnel into or out of. Thus, the STM provides information about the electronic states as well as the topography of the surface of the sample.

The resulting current between the tip and the sample based on the applied bias voltage varies exponentially relative to the distance between the tip and the surface of the sample. As a result of this strong dependence on the relative position of the tip to the sample, the height of the tip above the surface can be precisely controlled. Often, a piezoelectric element is used to control movement of the tip up and down (i.e., z-direction) until the measured tunnel current matches a set point value, which is in the range of 0.01-100 nA. Piezoelectric elements are also commonly used to move the tip sideways (i.e., x-y directions) across the surface of the sample. As a result, topographic images of the surface are commonly generated by performing a raster scan of part of the surface. In some embodiments, images of the surface are generated by performing spiral, Lissajous or other tip motions across the surface which cover every part of a portion of the surface.

In order to have the tip access larger areas of a sample and to allow the tip to approach a sample, many STM systems also include both fine motion control and coarse motion control for the X, Y, and Z axes. For instance, coarse motion is in the range of tens of nanometers to tens of millimeters, with a precision finer than the maximum fine motion range. In contrast, the fine motion may be precise enough to position the tip at specified locations between atoms. Most STM systems include some vibration isolation mechanisms to prevent external vibrations from disturbing the system operation.

Hydrogen Depassivation Lithography

Hydrogen depassivation lithography, where an STM is used to remove hydrogen atoms from a silicon surface has been established since the mid-1990s. See, for example, Snow, E. S., et al., "Fabrication of Si nanostructures with an atomic force microscope," Appl. Phys. Lett., Vol. 64, No. 15, 1932 (1994), which is hereby incorporated by reference in its entirety. Further, Lyding and Hersam demonstrated that individual hydrogen atoms could be targeted and removed from a silicon substrate such as in Hersam, M. C., et al., "Silicon-based Molecular Nanotechnology," Nanotechnology, Vol. 11, No. 2, 70 (2000), which is hereby incorporated by reference in its entirety. Since then, a number of practitioners have demonstrated the ability to form patterns using hydrogen depassivation for various purposes.

Hydrogen depassivation lithography can be accomplished at different biases and set point currents. There are several different regimes that are distinct from one another in important aspects. Typically, during depassivation lithography the sample is positive with respect to the tip so that electrons flow from the tip to the sample. At biases below 7V, the hydrogen depassivation efficiency is a strong function of the bias and is also dependent on the current. For example according to Shen, T. C., et al., "Atomic-Scale Desorption Through Electronic and Vibrational Excitation Mechanisms," Science Vol. 268, 1591 (1995) (which is herein incorporated by reference in its entirety), at 3V and 1 nA more than 10 billion electrons are required to depassivate a single hydrogen atom. The depassivation efficiency rises dramatically with bias until 7V where approximately half a million electrons are required to depassivate a single hydrogen atom and there is no longer a dependence on current. From 7-12V the depassivation efficiency is essentially constant and does not depend on current.

There is also significant difference in how the electron reaches the sample from the tip at the lower biases versus higher biases. At low positive sample biases, the electrons tunnel from the tip to the sample and the physics favors most electrons finding the shortest path resulting in most electrons tunneling to the same nanoscopic area with very few electrons reaching the surface outside of this very small area. Because of this process, at biases of approximately 4 volts and below, atomic precision patterning is possible. Indeed, single hydrogen atoms may be targeted and removed at low biases. Also, it is possible to create patterns where all hydrogen atoms are removed (fully saturated depassivation) within the desired area and no atoms removed outside the pattern or at most the edge of the pattern will deviate by no more than the distance of one atom from the designed pattern.

At higher biases, there is the opportunity for field emission (Fowler Nordheim tunneling) of electrons from the tip into the vacuum and then a short trip along field lines to the sample. This electron path, along with the fact that the tip will generally be further from the sample at higher biases, results in electrons reaching the sample over larger areas.

Hydrogen depassivation has been reported with a negative sample bias. However, the depassivation efficiency may be lower than that of a positive sample bias. On the other hand, the low depassivation efficiency at low negative sample biases permits effective imaging without inadvertent depassivation. It is also possible to image the sample with little or no depassivation at low positive sample biases with low set point currents.

Hydrogen depassivation lithography has demonstrated atomic resolution patterning, and it has the advantage of having the same tool that does the patterning, the STM, to also be capable of examining the patterning area before and after exposure.

BRIEF DESCRIPTION OF THE DRAWINGS

Illustrative embodiments of the present disclosure will be described with reference to the accompanying drawings, of which:

FIG. 8 is a diagrammatic schematic top view of a silicon lattice structure sample having a lithographic exposure zone according to an embodiment of the present disclosure.

DETAILED DESCRIPTION

Figure 1:
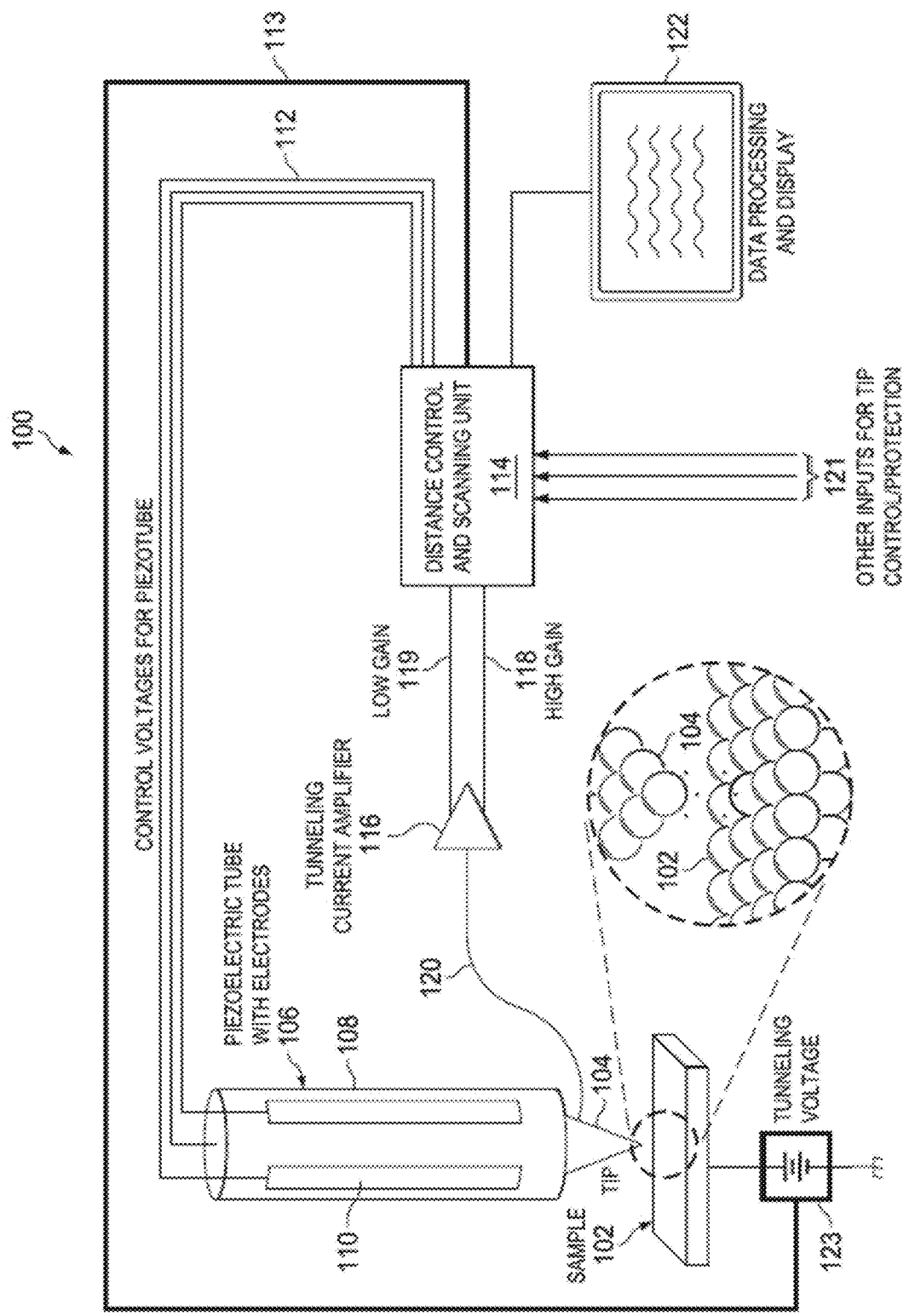
FIG. 1 is a diagrammatic schematic view of a STM system according to an embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described methods, devices, and systems, and any further application of the principles of the present disclosure are fully contemplated and included within the present disclosure as would normally occur to one skilled in the art to which the disclosure relates. In particular, it is fully contemplated that the steps, features, and/or components described with respect to one embodiment may be combined with the steps, features, and/or components described with respect to other embodiments of the present disclosure. For the sake of brevity, however, the numerous iterations of these combinations will not be described separately.

Scanning Tunneling Microscope System

Referring initially to FIG. 1, shown therein is an STM system 100 according to an embodiment of the present disclosure. As shown, a sample 102 is positioned in close proximity to a tip 104 of the STM system 100. The tip 104 is a conductive tip (e.g., formed of tungsten, platinum-iridium, or other suitable conductive material) that has been prepared so as to have a nanoscopic portion of the tip which allows electrons to tunnel to or from the nanoscopic portion of the tip to a sample. With the tip 104 positioned close to an upper surface of the sample 102, current flows across the gap between the tip 104 and the sample 102 when a bias voltage is applied between the tip 104 and the sample 102 due to the principle of electron tunneling. The bias voltage applied between the tip 104 and the sample 102 can be either polarity. If the sample 102 is negatively biased with respect to the tip 104, then electrons flow from the filled electronic states on the surface into the tip 104. If the sample 102 is positively biased, then electrons flow from the tip 104 into the empty electronic states of the surface. The magnitude of the bias voltage determines the surface states that are available to tunnel into or out of.

During electron tunneling, the resulting current between the tip 104 and the sample 102 based on the applied bias voltage varies exponentially relative to the distance between the tip 104 and the surface of the sample 102. As a result of this strong dependence on the relative position of the tip 104 to the sample 102, the height of the tip 104 above the surface can be precisely controlled. In the illustrated embodiment, a controller 106 precisely controls the movement of the tip 104 relative to the sample 102. The controller 106 includes a piezoelectric element 108 coupled to a plurality of electrodes 110. While the piezoelectric element 108 is depicted as a single element, it is understood that the piezoelectric element 108 includes a plurality of piezoelectric elements in some instances. To this end, in some implementations one or more piezoelectric elements are configured to control movement of the tip 104 in a particular direction or directions (e.g., x-direction, y-direction, and/or z-direction). By controlling the application of voltage to the piezoelectric element 108 via the electrodes 110, the controller 106 is able to control movement of the tip 104 relative to the sample 102 and the sample bias unit 123 (tunneling voltage). To this end, a plurality of electrical leads 112 couple the electrodes 110 to a control unit 114. Also, electrical lead 113 couples the control unit 114 to the sample bias unit 123 to allow the control of the sample bias. In some instances, the control unit 114 determines the appropriate voltage to be applied to each electrode 110 to impart the desired movement to the tip 104.

In some embodiments, the control unit 114 may include processing resource such as one or more central processing units (CPUs) and/or a digital signal processors (DSPs) programmed to control the STM system 100 as is described herein. In doing so, the control unit 114 may include a software program stored on or in a non-transitory machine-readable medium accessible to the processing resource to cause the processing resource of the control unit 114 to perform certain operations. As will be described in more detail herein, one or more control systems implemented by the control unit 114 may drive the tip 104 to predetermined points proximate the sample 102 and use the current between the tip 104 and the sample 102 to pattern the sample 102 and thereby perform a lithographic process.

In some embodiments, the scanning tunneling microscope system 100 includes both fine motion control (e.g., on the order of an Angstrom to microns) and coarse motion control, which can be as large as required for the job at hand. For instance there are high resolution stages from Attocube, PI, and other vendors that allow more than a cm of motion and larger range of motion is, in principle, possible. In some instances, course motion is in the range of tens of nanometers to tens of millimeters, with a precision finer than the maximum fine motion range. In that regard, the STM system 100 may include one or more additional controllers or actuators to facilitate coarse movement of the tip 104 in the x, y, and/or z-directions. Further, in some implementations the scanning tunneling microscope system 100 includes one or more controllers or actuators for moving the sample 102 in the x, y, and/or z-directions relative to the tip 104. While any permutation of motion control may be used, in some instances the scanning tunneling microscope system 100 utilizes one of the following arrangements: (1) the sample 102 is stationary and the tip 104 does all of the coarse and fine movements relative to the sample 102; (2) the tip 104 is stationary and the sample 102 does all the coarse and fine movements relative to the tip 104; or (3) the tip 104 does all of the fine movements and the sample 102 does all of the coarse movements. Further, it is understood that the particular combination of coarse and fine motion control may be applied globally (i.e., to all directions of movement) or to a specific direction or directions (e.g., x, y, and/or z-directions). Accordingly, it is understood that the scanning tunneling microscope system 100 may utilize any one or a combination of these motion control options in implementing the motion control features discussed herein below.

In some instances, the scanning tunneling microscope system 100 includes one or more tip motion encoders to track movement of the tip 104. For example, in some implementations encoders with an accuracy of one micrometer or better, and preferably less than 100 nm, are utilized to track coarse motion in the x and y-directions. An encoder is utilized to track the z-direction motion, in some instances, to reduce the amount of time required to position the tip 104 in close proximity to the sample 102. In some instances, the closed loop position control described herein with respect to the fine motion control is not utilized and/or turned off when coarse movements are being made. Fine motion encoders are also utilized in some instances. To this end, x, y, and/or z-direction fine motion encoders with an accuracy 1 nm or less, and preferably less than 100 pm, are utilized in some instances. The information from the fine motion encoder(s) can be utilized instead of or in addition to the current feedback loop (utilized for assessment of z-direction control) and/or the lattice structure fiducial grid (utilized for assessment of x-y direction control) as described below. As described below, in some instances the automated patterning processes of the present disclosure utilize an active feedback loop and/or well-calibrated model corrections to ensure that the tip position in the x-y direction is accurate to approximately 0.1 nm.

The control unit 114 is configured to receive signals from a tunneling current amplifier 116 over communication lines 118 and 119. In the illustrated embodiment, the amplifier 116 is represented as a two-stage amplifier having a high gain output along communication line 118 and a low gain output along communication line 119. The amplifier 116 is electrically coupled to the tip 104 by line 120. In some instances, the control unit 114 utilizes the measured tunnel current from the tip 104 and/or other input(s) 121 to control the voltages applied to the electrodes 110. Additional aspects of the manner in which the control unit 114 controls the application of voltages to the electrodes 110 and corresponding movement of the tip 104 relative to the sample will be discussed in greater detail below. The control unit 114 is in communication with a data processing and display system 122 that is configured to process the data received from tip 104 and generate a corresponding image of the sample 102.

Because the tip 104 is positioned above the surface of the sample in a precisely controlled manner, at least the portion of the system 100 associated with tip 104 may be isolated from any external vibration in order to prevent vibrations from harming the imaging resolution and to prevent any perturbations that might cause the tip 104 to collide with the surface. Vibration isolation may be used to facilitate maintaining approximately +/−0.1 nm positioning control. For example, some implementations of the present disclosure suspend the system by springs and dissipate vibrations using eddy current damping. However, any suitable vibration isolation techniques may be utilized.

Lithography Using the Scanning Tunneling Microscope System

Figure 2:
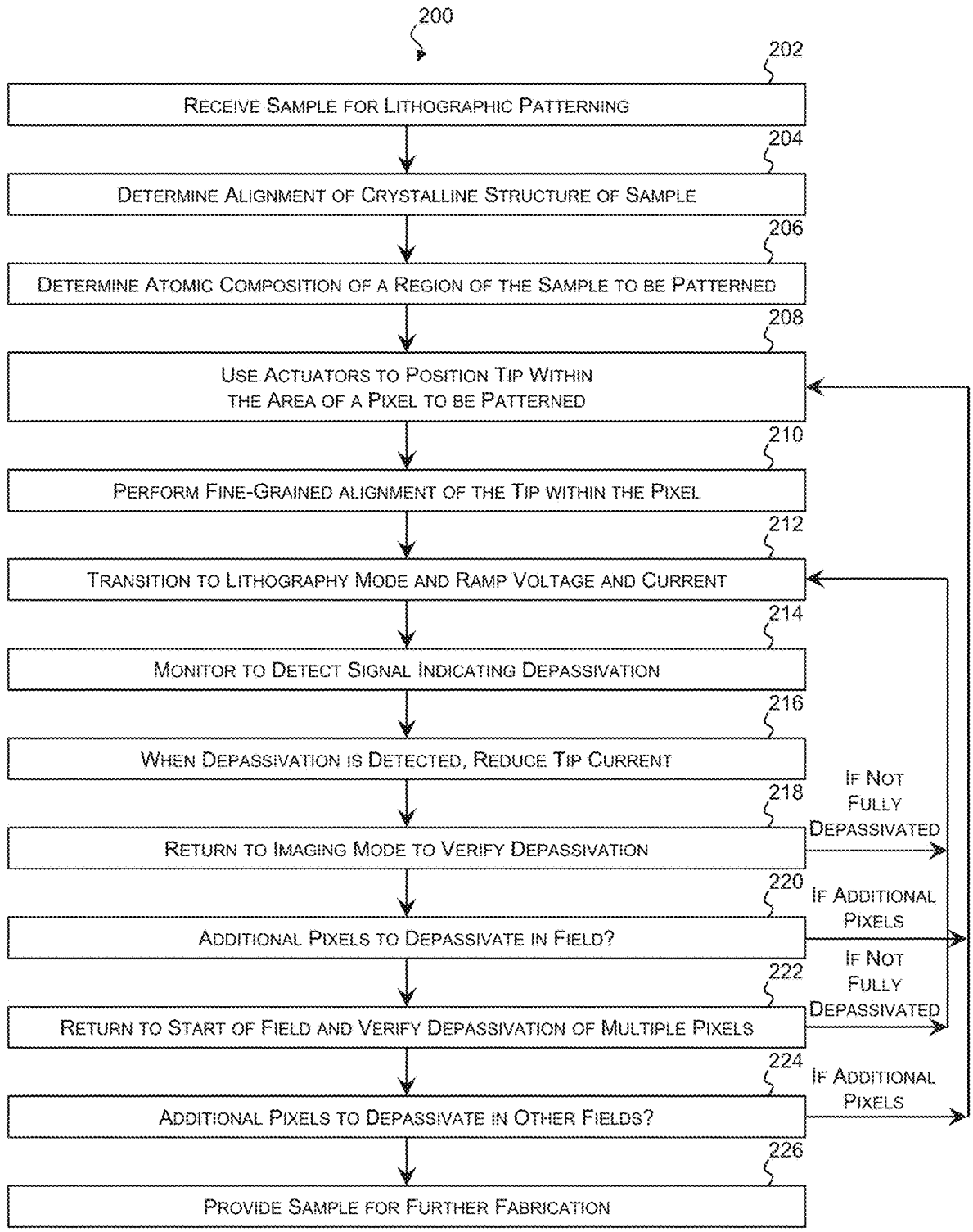
FIG. 2 is a flow diagram of the method of lithographically patterning a sample using an STM system according to an embodiment of the present disclosure.

A method of patterning a sample 302 that may be performed using the STM system 100 of FIG. 1 and/or other suitable system is described with reference to FIGS. 2-8. In that regard, FIG. 2 is a flow diagram of the method 200 of lithographically patterning a sample using an STM system according to an embodiment of the present disclosure. The method 200 may be performed by one or more components of an STM system, such as the control unit 114 of the STM system 100 of FIG. 1, executing instructions stored on or in a non-transitory machine-readable medium. Additional steps may be performed throughout the method 200, and steps of the method 200 may be omitted or replaced in various embodiments described herein.

Figure 3:
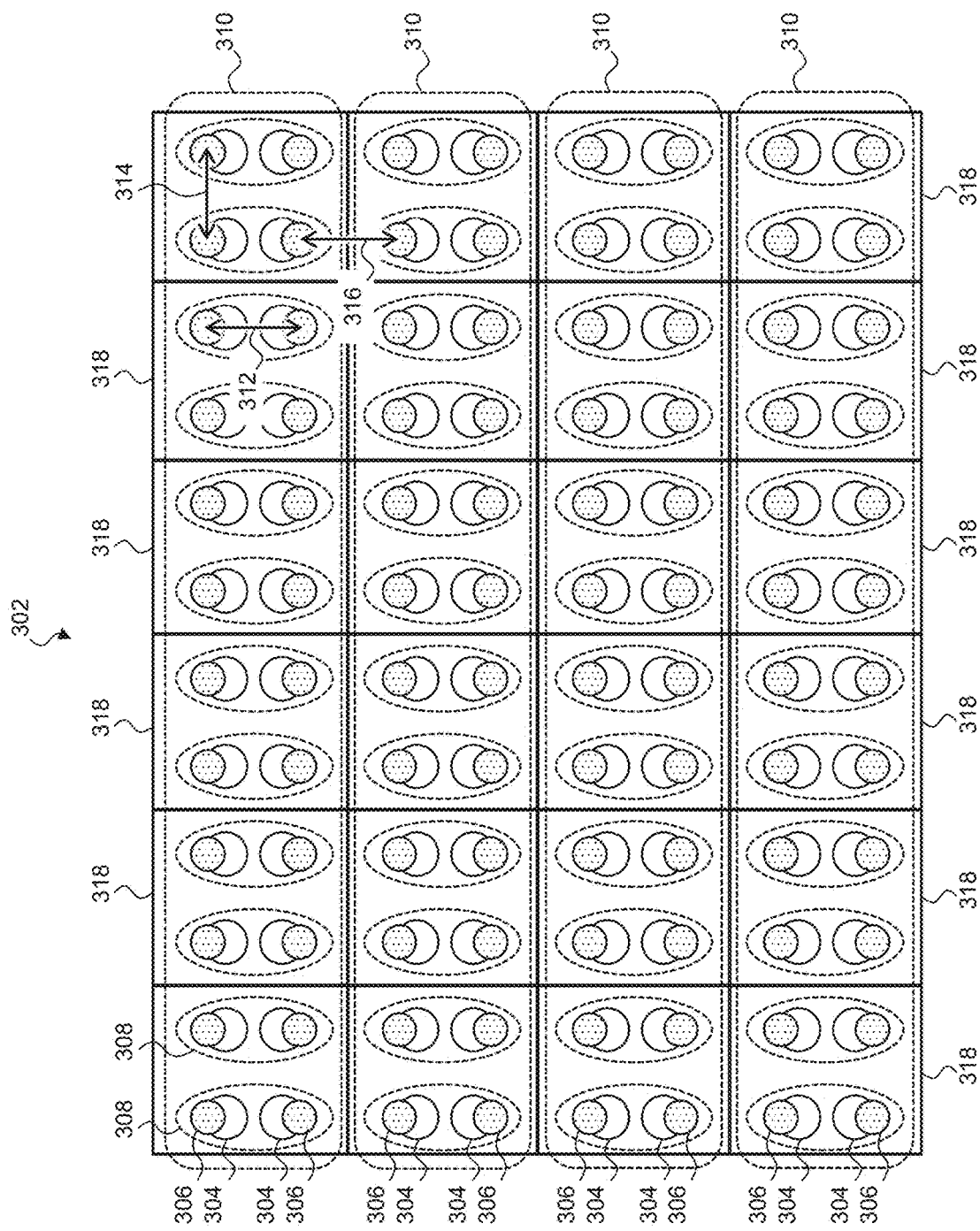
FIG. 3 is a diagrammatic schematic top view of a silicon lattice structure sample according to an embodiment of the present disclosure.
Figure 4:
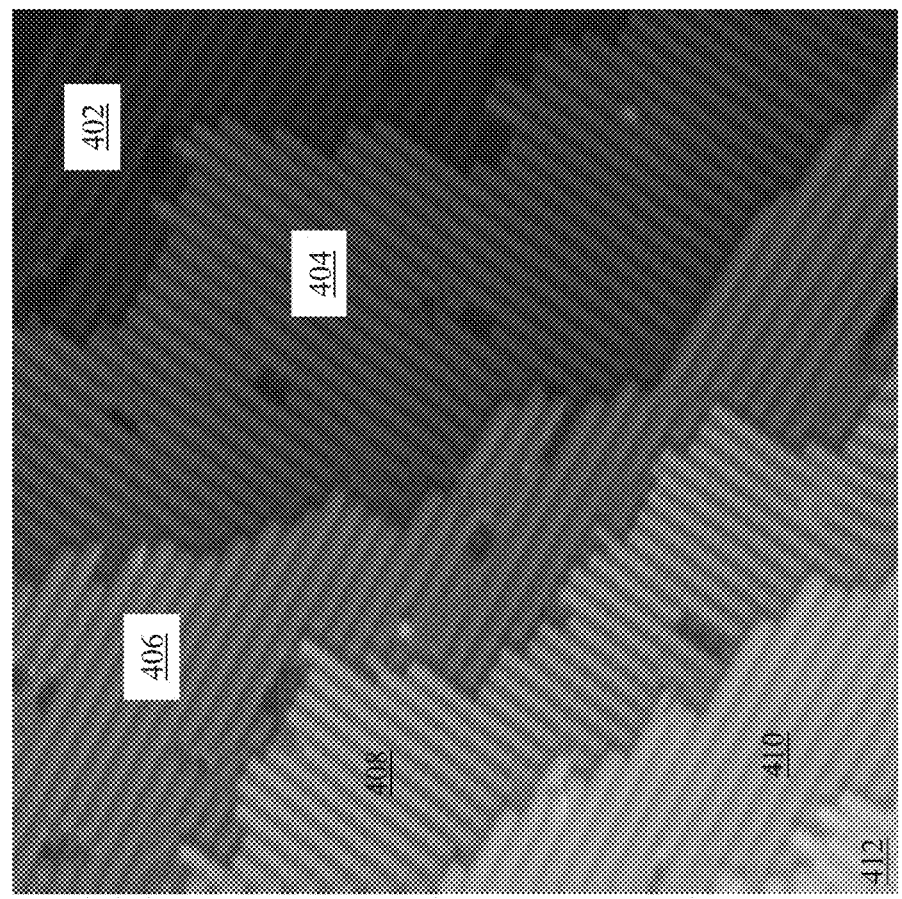
FIG. 4 is an STM image of a top surface of a sample according to an embodiment of the present disclosure.
Figure 5:
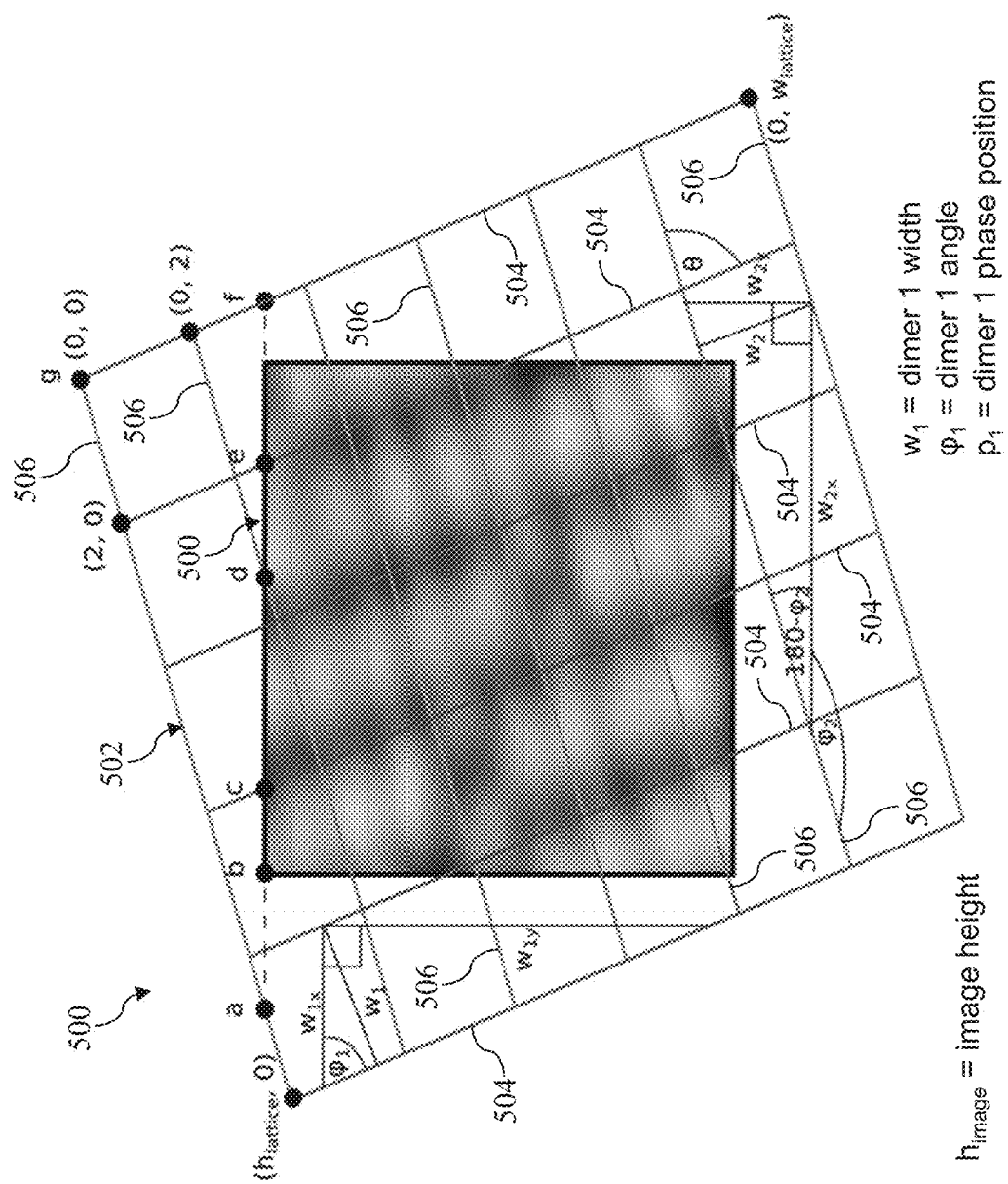
FIG. 5 is an STM image of a region of a sample overlaid with a lattice structure grid according to an embodiment of the present disclosure.

FIG. 3 is a diagrammatic schematic top view of a silicon lattice structure sample 302 according to an embodiment of the present disclosure. FIG. 4 is an STM image of a top surface of the sample 302 according to an embodiment of the present disclosure. FIG. 5 is an STM image 500 of a region of the sample 302 overlaid with a lattice structure grid according to an embodiment of the present disclosure.

Referring to block 202 of FIG. 2 and to FIG. 3, a sample 302 is received for patterning. In some implementations, the sample 302 is a silicon wafer or a portion thereof obtained and prepared using known surface preparation techniques (See e.g., Miki, K., et al., "Surface preparation of Si substrates for epitaxial growth," Surface Science, Vol. 406. Issues 1-3, 312 (1998), which is hereby incorporated by reference in its entirety). In FIG. 3, the sample 302 is a Si (100) surface passivated with hydrogen atoms. The surface Si atoms are represented by unfilled markers 304, and H atoms bonded to the surface Si atoms are represented by filled markers 306. Such surface preparation techniques, when performed on a Si(100) wafer, produce a 2×1 reconstructed hydrogen terminated surface. In more detail, an ideal cleaved Si(001) surface would have two dangling bonds per surface atom absent any passivation. To minimize surface energy, the silicon may reconstruct by distorting the surface atoms. In an example, this reconstruction is driven by surface energy reduction by reducing the number of dangling bonds. The surface Si atoms form pairs called dimers 308, with only one dangling bond remaining per Si atom. Thus, there are two bonding sites for H atoms per Si dimer 308.

The dimers are organized into dimer rows 310 that include a plurality of dimers 308 oriented in a common direction. The spacing between H atoms 306 in a passivated dimer 308, represented by marker 312, may be less than the spacing between adjacent H atoms 306 in different dimers 308 in the same dimer row 310, represented by marker 314, and the spacing between adjacent H atoms in different dimer rows 310 represented by marker 316. In various examples, the spacing 312 between the H atoms in a dimer 308 is about 0.3 nm, whereas spacing 314 is about 0.384 nm and spacing 316 is about 0.4684 nm. Put another way, the exemplary dimer rows 310 have a pitch between dimers 308 of about 0.384 nm and a pitch between rows 310 of about 0.768 nm.

The dimer rows are a strong structural feature and provide a frame of reference to orient one dimension of a lithography pixel since the low-bias mode of H depassivation lithography described later in this document has a line width of 1 dimer row. A pixel or pixel region 318 represents a minimum-sized region of the sample 302 to be patterned concurrently and may be any arbitrary size made up of some grouping of surface Si atoms. Accordingly, in some embodiments, two adjacent dimers 308 in the same dimer row 310 are grouped into a pixel 318. Although each dimer 308 of each pixel 318 is illustrated as being bonded with two hydrogen atoms, a single dimer may also be bonded to a single hydrogen atom or may bond to no hydrogen atoms. In that regard, the method 200 that follows may debond hydrogen atoms within a pixel 318 so that the dimers 308 of the pixel 318 include only one or no bound hydrogen atoms. In general, it is goal of the lithography process to remove all H atoms from those pixels that the desired pattern is intended to expose and not remove H atoms from pixels that are not to be exposed. However, in some implementations a pixel may be considered exposed if less than all four atoms are removed. The definition of an exposed pixel may depend on the application.

Illustrated in FIG. 4 is a more detailed view of the sample 302 of FIG. 3 as imaged by a STM. Being a real-world example, the sample 302 is imperfectly cut and includes terraces 402-412 of different height and different dimer row orientations. The different heights of the terraces are shown by different grey levels, from dark grey at the lowest terrace 402, and light grey at the highest terrace 412. In an example, the height difference between each atomic layer is about 0.135 nm. Within a terrace, the dimer rows 310 are oriented parallel to each other, and between terraces, the dimer rows 310 of a terrace extend perpendicular to the dimer rows 310 of the adjacent terraces due to the diamond lattice structure of silicon. Accordingly, in the illustrated embodiment, the dimer rows of terraces 402, 406, and 410 each extend in a direction from the top left corner to the bottom right corner of the image, while the dimer rows of terraces 404, 408, and 412 each extend in a direction from the top right corner to the bottom left corner of the image.

Even for wafers cut with very low miscut angles, the size of a single atomically flat terrace (i.e., any one of terraces 402-412) may be only several tens or hundreds of nanometers wide. Significantly larger atomic terraces may be formed by deliberately creating troughs or walls in the silicon substrate and using the high surface mobility of the silicon atoms at elevated temperatures, as described by Fuechsle, M., et al., "Surface gate and contact alignment for buried, atomically precise scanning tunneling microscopy-patterned devices," J. Vac. Sci. Technol. B, Vol. 25, 2562 (2007) and Li, K., et al., "Controlled Formation of Atomic Step Morphology on Micropatterned Si (100)," J. Vac. Sci. Technol. B Vol. 29, 041806 (2011), each hereby incorporated by reference in its entirety.

Referring to block 204 of FIG. 2, the control unit 114 of the system 100 determines the alignment and orientation of the crystalline structure of a region (e.g., one or more terraces) of the sample 302 and determines any step edges. This may include determining the alignment and orientation of the dimer rows 310 in the region. In more detail, the precision and accuracy of the depassivation lithography processes of the present disclosure are facilitated in some respects by the ability to image and align to the crystal lattice structure. To this end in some implementations, the image of the crystalline surface as observed with a STM is utilized as the global address grid for pattern generation. The automated recognition of the address grid based on the image of the surface is accomplished with real space image analysis, Fourier analysis, and/or combinations thereof.

In an image-based example, the determination of block 204 includes: (1) receiving an STM image of the region of the sample 302, (2) identifying the lattice structure from the image, and (3) identifying terraces and step edges from the image.

With a two-dimensional scanned image of the region of the sample 302 received, the system may identify the lattice structure by first performing a linear fit on the image of the sample 302 to remove any image tilt. In this regard, if the sample includes multiple terraces, then the linear fit is applied to each terrace independently. In some implementations, the linear fit is a least squares plane fit and that is performed to each terrace separately in order to prevent tilt. However in other instances, an algorithm is applied to the entire surface in parallel.

The system 100 may then perform a Fourier transform on the linearly fit image. In the case of a Si(100) surface, the dimer row 310 may be the most prominent periodic feature. By searching for a peak in the absolute value of the Fourier transform nearest the expected dimer row frequency, the dimer rows 310 are identified. Likewise, by searching for a perpendicular peak that would appear if there are step edges in the image, the presence of any transitions between terraces of the sample can be identified. In some instances, the image is analyzed for a peak in the second harmonic of the expected dimer row frequency, which can provide additional information about the location of the dimers 308. In some instances, higher harmonics are also searched for in the image. In this regard, the presence (or lack thereof) of the higher harmonics provides an indication of the quality of the image. From the position of the peaks, the pitch and angle of the dimer rows 310 are determined. The complex phase at the peaks gives the position of the dimer rows 310 and dimers 308 in real space.

To identify terraces and step edges from the image, the system 100 may apply a thresholding algorithm to the image. In that regard, in an embodiment, a transition between terraces is determined by detecting whether a step edge exists between two different locations on the surface of the sample 302. For example, in some instances the image is analyzed to determine if there has been a shift in atom position indicative of the presence of an intervening step edge. In some instances, a threshold between 0.06 nm and 0.10 nm is utilized, with some particular implementations utilizing a +/−0.08 nm threshold. In this regard, single atomic step edges are 0.135 nm high on a Si(100) surface. Accordingly, where the tilt has been removed, the surface atoms for that terrace may be well contained within the +/−0.08 nm threshold. However, the value of the threshold may be larger or smaller, and may vary depending on the sample type.

In some examples, identifying step edges includes applying a shrink-grow-shrink algorithm to the received image of the sample 302. The shrink-grow-shrink algorithm identifies and/or eliminates features that are either too big or too small. If features in an image are shrunk by a certain amount and the remaining features are regrown by the same amount, then features below a certain size are eliminated but the original features are largely retained. On the other hand, if the process is reversed (grow first then shrink), then holes of a certain size are eliminated. In an embodiment, the amount to shrink and grow by was designed to be similar to half of the dimer row pitch (~0.4 nm or roughly the size of an atom). This eliminates dimer vacancies, dangling bonds, and other surface anomalies occurring in a given terrace. It also cleans up the edges. In the illustrated embodiment, the shrink and grow operations were combined into a 1× shrink, 2× grow, 1× shrink implementation in an effort to eliminate both isolated features and holes. However, other size shrink and grow operations may be utilized in a similar manner. Varying the parameters of the rules by which features are shrunk and grown affect what is removed (and what is not) and the shape of the features that remain. Accordingly, the rules can be optimized based on the desirability to remove or preserve features of the sample. In some implementations, the terraces are identified using the techniques described in Randall, J. N., et al., "Automated Scanning Tunneling Microscope Image Analysis of Si(100):H 2_1 Surfaces," Microelectronic Engineering, Vol. 98, 214 (2012), which is hereby incorporated by reference in its entirety. Other methods including Artificial Intelligence trained algorithms operating on images captured with different modes such as: topographical (as described above), current images, spectroscopic images, local barrier height images, and other imaging modes can be used individually or in different combinations to identify the relevant features on the Si surface.

In addition to or as an alternative to the image-based determinations, the alignment and orientation of the crystalline structure of the sample 302 and any step edges may be determined by using surface sampling techniques. Surface sampling may provide such information without taking a complete scan of the whole area, and thereby allow for much faster exploration of the surface than a regular high-precision STM scan of the surface.

In an example, an STM tip moves across the surface in a series of single scan lines, with much lower density than a typical STM scan. As it moves across the surface, the tip will detect sudden changes in average height as a step edge. In some cases, these apparent step edges are, in fact, a set of missing dimers. Therefore, for each apparent step edge, the tip may pause its scanning, and perform a small detailed scan over a limited area centered on the apparent step edge. The purpose of the small scan is to determine the precise location of the step edge, its type (i.e. A-type or B-type) and the direction of the dimer rows of the terraces above and below the step. For a single step, the system will expect there to be a 90° rotation of the dimer rows from the top to the bottom of the step. For a double step, there will be no rotation in the dimer row direction, but there will be a shift in the dimer row position, and a much greater change in height.

If the position of the step edges is determined along each scan line, the approximate course of the step edge across the whole surface can be interpolated. In some cases, more detailed knowledge of the step edge position is desired, e.g. if a write element may cross the step edge. In such cases, the tip may perform a dithered scan perpendicular to the step edge, moving along the step edge for some distance. In some examples, the step edge scan area extends to the limits of the fine motion actuators. The center of the dithered scan is adjusted to maintain the step edge in the middle of the scan, and the size of the dither would depend upon the roughness of the step edge. Thus, the step edge position is completely determined.

Either in addition to this, or in place of this scanning process, the tip may make a higher-resolution prescan of the location of each write element, to determine if the write element is contained within one terrace or crosses a step edge. Depending on the result of this pre-scan, the tip may then assign local pixel positions, tip vectors for the write field, or even adjusting the position of the whole Write Element.

Finally, as the dimer row direction should be constant across a whole terrace, and each single step is known to cause a 90° rotation in the direction of the dimer rows, the system can use the knowledge of the local dimer row direction to determine if any step edges have not been detected by the initial pre-scan. In such a case, the tip would perform further pre-scans to determine the location of any unidentified step edges.

FIG. 5 illustrates a result of block 204 and shows an STM image 500 of the sample 302 overlaid with a grid 502. The grid 502 is defined by a first set of grid lines 504 in a first direction and a second set of grid lines 506 that extend at an angle, which can be approximately 90 degrees, to the first set of grid lines 504. The sets of grid lines are aligned with the underlying lattice structure of the sample. In the illustrated embodiment, the first set of grid lines 504 extend parallel to the dimer rows 310 of the sample 302 and the second set of grid lines 506 extend parallel to the dimers 308. More specifically, in the illustrated embodiment a single grid square (defined by the area between a pair of adjacent grid lines 504 and a pair of adjacent grid lines 506) encompasses a pair of dimers 308 of the underlying lattice structure (e.g., for the illustrated Si (100) surface the grid square encompasses four silicon atoms grouped into two pairs (each pair of silicon atoms defining a dimer 308)). Accordingly, in some implementations, each grid square corresponds to a pixel 318 that will be utilized to plot a desired design pattern to the sample 302. It is understood that different size grid squares and/or pixels 318 are utilized in other implementations. However, for the sake of clarity in explanation, the following description will assume that the patterns are designed with pixels 318 corresponding to grid lines 504 and 506 of grid 502. It is noted that each pixel 318 may be a square on the actual surface, but in the image of FIG. 5, these pixels 318 appear generally as parallelograms due to scanning artifacts.

Further details about techniques for determining the alignment and orientation of the crystalline structure of a sample can be found in U.S. Pat. No. 9,329,201, which is herein incorporated by reference.

With the overall lattice structure determined and the different terraces identified, the system may evaluate properties of individual dimers 308. Referring to block 206 of FIG. 2, the control unit 114 determines an atomic composition of each dimer 308 and/or pixel 318. This may be performed concurrently with block 204 and may be determined from the same image and/or surface sampling technique.

In the two-dimer (four-atom) pixel 318 configuration in the context of a Si(100) surface, a square pixel 318 that is sub-nm in dimension is provided. There may be between zero and four hydrogen atoms present per pixel 318, and depending on the application and the number of hydrogen atoms present, each pixel 318 may be treated as exposed (depassivated), unexposed (passivated), or partially exposed. There may be different definitions as to what constitutes an exposed (depassivated) or an unexposed (passivated) pixel. In the most stringent case, an unexposed (passivated) pixel will have all four of its passivating hydrogen atoms present and an exposed (depassivated) pixel will have all four hydrogen atoms removed. Any pixel with one, two, or three hydrogen atoms is partially exposed. In contrast, when using the hydrogen resist to define where phosphorus is to be deposited on a silicon surface, a single missing hydrogen atom may prevent a phosphorus atom from being deposited. However, adjacent missing hydrogen atoms in the same pixel or on adjacent pixels (i.e., the missing atoms are adjacent along or across a dimer row) may allow phosphorus to be deposited. Accordingly, in this and other applications of hydrogen depassivation lithography, an unexposed pixel includes some configurations of two hydrogen atoms present, and pixels with either three or four hydrogen atoms present. An exposed pixel may have zero, one, or other configurations of two hydrogen atoms. Similarly, there are applications where an exposed pixel includes pixels with either one hydrogen atom or zero hydrogen atoms. In sum, the definition of what constitutes an exposed (depassivated) and/or unexposed (passivated) pixel may be determined based on the particular configuration of the removed H atoms within each pixel, and between adjacent pixels. The number of adjacent H atoms required for depassivation for a particular application of the depassivation lithography process, may also vary.

During block 206, the system 100 determines whether each pixel 318 in the region is passivated or has already been depassivated. For example, a threshold analysis may be performed on the image of block 204. The height of the STM image at the precise location expected for the atom may reveal passivation or depassivation, with the depassivated locations appearing up to 0.15 nm taller than the background. For example, if the expected position of an atom as identified by the analysis above for a particular terrace where a least squares plane fit drives the average value (height) of the terrace to zero, then any position below −0.04 nm can be considered a vacancy, any position from −0.04 nm to 0.07 nm can be considered an H passivated atom, and any position above 0.07 nm can be considered a dangling bond or some other surface contamination. More elaborate analysis, such as template matching, can provide additional information regarding the properties of a dimer 308. For example, template matching can also help identify partially passivated dimers 308, including determining which of the dimer's bonds has been depassivated.

Having identified a region suitable for patterning and having mapped the crystalline surface, referring to blocks 208-224, the system utilizes the depassivation of a monolayer of atoms or molecules from the crystalline surface to create atomically precise patterns using the grid as a reference. For the sake of clarity, in the embodiments described below, hydrogen depassivation of a silicon substrate will be utilized as the example. More specifically, the removal of hydrogen atoms from a Si (100) 2×1 surface will be described. However, it is understood that the present disclosure has application to other surface reconstructions, crystal faces, crystalline materials, and/or resist layers. In that regard, those of ordinary skill in the art will recognize that the principles of the present disclosure can be adapted to these other applications by taking into consideration the characteristics of the particular sample.

In some examples, the region of the sample 302 to be patterned is subdivided into write fields 602. Each write field 602 may be sized to include an integer number of pixels and small enough that the tip 104 can traverse the write field 602 using the fine motion actuators without use of the coarse motion actuators. In more detail, the scan range of the fine motion actuators utilized to control movement of the tip 104 may be only a few microns or even less. The size of the write fields 602 may be selected such that the fine motion actuators can be used to move the tip 104 within a particular write field 602 and into at least the immediately adjacent write fields 602. In this way, atomically precise features may be formed in a given write field 602 and connecting features may be formed between the field and its neighbors. In further examples, the write fields 602 are sized so that the fine motion actuators can be used to move across several write fields 602. In some instances, each write field 602 has a width extending in the X-direction between about 20 nm and about 500 nm, and a height extending in the Y-direction between about 20 nm and about 500 nm.

Figure 6:
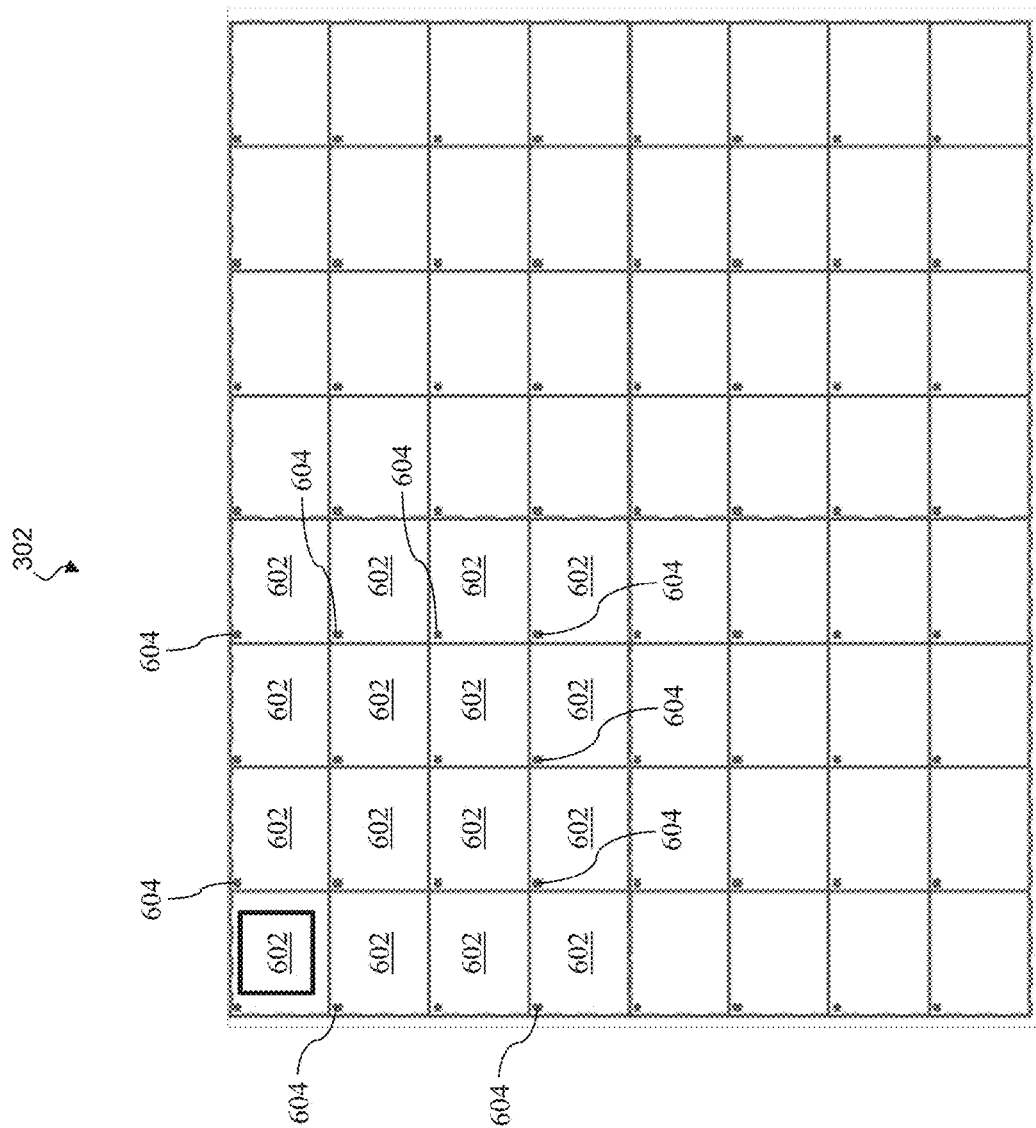
FIG. 6 is a diagrammatic top view of a plurality of write fields according to an embodiment of the present disclosure.

Referring first to block 208 of FIG. 2 and FIG. 6, which is a diagrammatic top view of a plurality of write fields according to an embodiment of the present disclosure, the control unit 114 moves of the tip 104 of the STM proximate to a location of the sample 302 to be patterned. As explained above, the control unit 114 may use coarse motion actuators to move the tip 104 into the vicinity of a write field 602 and fine motion actuators to move the tip 104 within the write field 602 and into adjacent write fields 602.

To guide the coarse movement (and the subsequent fine movement of block 210), reference points or fiducial markers within the write fields 602 may be used to guide the tip 104. In the illustrated examples, each write field 602 includes a fiducial marker 604 that allows the tip 104 of the STM 100 to be positioned with respect to it. The fiducial markers 604 may be physical structures of the lattice structure that are located through imaging or some other process. The physical structures relied upon as fiducial markers 604 may be existing features of the sample (e.g., step edges between terraces, dangling bonds, dimer vacancies, or other features identifiable on an image from a STM) or may be created by the STM system 100 (e.g., portions of the written pattern, dangling bonds created specifically to serve as position markers, and/or other surface features defined by the STM system 100). In these examples and others, the fiducial markers 604 are referred to during the pattern writing process in order to make sure that positioning relative to an absolute address on the patterning grid is maintained as the pattern is created.

Figure 7:
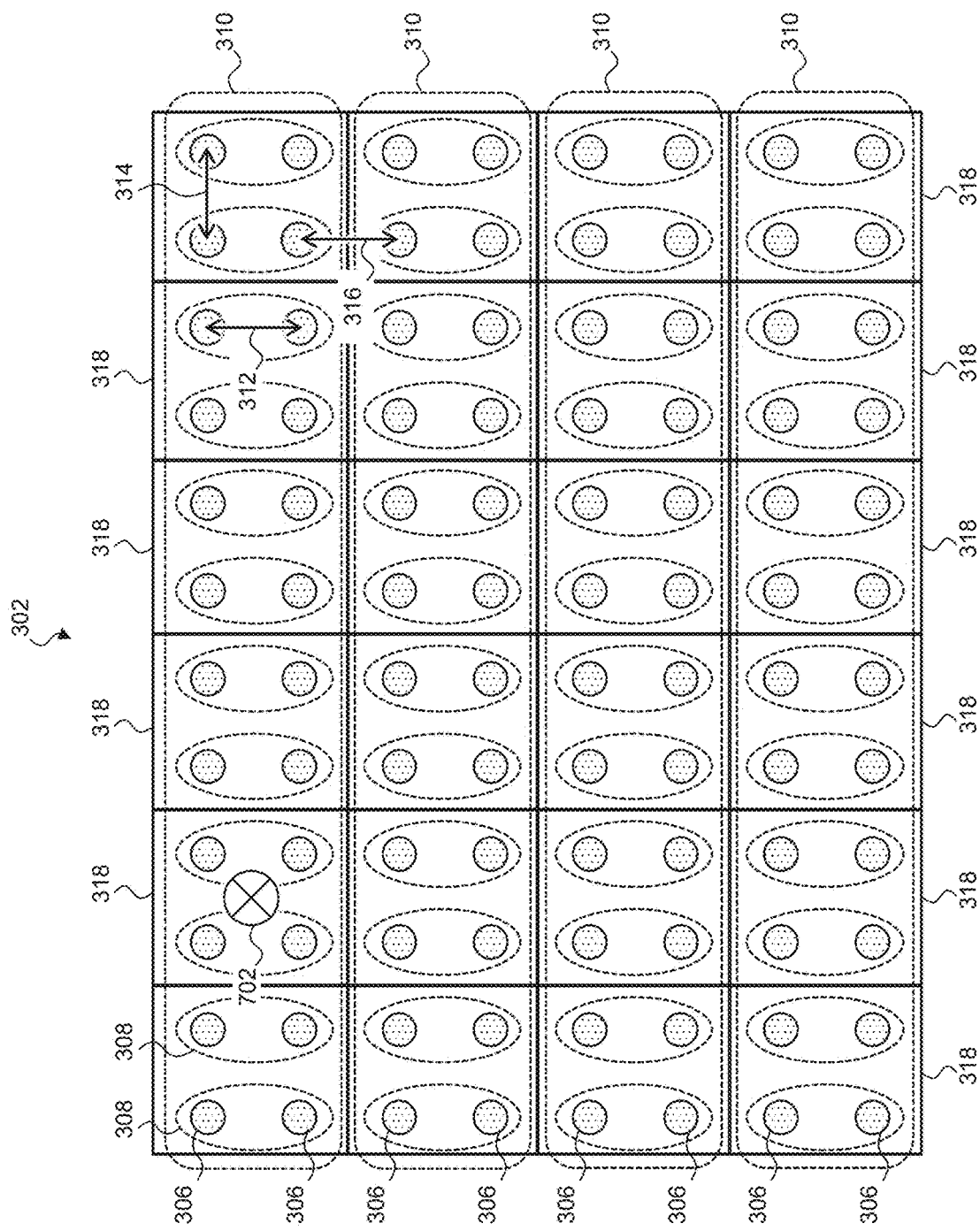
FIG. 7 is a diagrammatic schematic top view of a silicon lattice structure sample undergoing lithography according to an embodiment of the present disclosure.

Referring to block 210 of FIG. 2 and to FIG. 7, which is a diagrammatic schematic top view of the sample 302 undergoing lithography according to an embodiment of the present disclosure, the control unit 114 uses the fine motion actuators to move of the tip 104 (indicated by marker 702) of the STM 100 directly over a pixel 318 of the write field 602 to be patterned. For clarity, only the atoms of the pixel 318 to be debonded (e.g., the H atoms 306) are shown. As explained above, a pixel 318 may represent a minimum-sized region of the sample 302 to be patterned and may be any arbitrary size. In the illustrated example, a pixel 318 includes two adjacent dimers 308 in the same dimer row 310.

The STM system 100 may utilize any suitable technique or combination of techniques to bring the tip 104 over the pixel 318 to be patterned and to recognize when the tip 104 is centered over the pixel 318. The components that control the coarse motion of block 208 may be different than the piezoelectric actuators or other elements that are utilized to control the fine motion, and as a result of the coarse movement of the tip, it may be necessary for the tip 104 to be re-referenced to the lattice structure of the sample 302 in order to locate the pixel 318.

In an example, the STM system 100 first brings the tip 104 over the pixel 318, although not necessarily centered, by first positioning the tip 104 in a known position, such as over the fiducial marker 604, over a previously identified pixel 318, and/or over another landmark on the surface of the sample 302. The system 100 then moves the tip 104 from the known position to the pixel 318 using an open loop control position control, a closed loop position control (e.g., the tip motion encoders described above) or other suitable control that moves the tip 104 by a specified amount in a specified direction. This process may become more accurate and efficient as elements of the pattern are written because the written portions of the pattern can be used as fiducial markers, which may reduce the distance between the known position and the pixel 318.

Once the tip 104 has been brought over some portion of the pixel 318 to be patterned, a lattice lock process is used to align the tip 104 to the crystalline lattice and to find the center of the pixel 318. While many examples of the present disclosure maximize tip position tolerance so that the tip does not have to be in the exact center of the pixel to do accurate exposures, the more accurately that the centering can be done, the larger the exposure zone can be, which will result in higher currents and faster exposures. Therefore, in these examples and others, the system 100 utilizes a centering process configured to optimize speed and accuracy. This centering can be accomplished by a number of methods that involve the tip sensing the surface atoms without actually coming into physical contact with the sample. For this purpose, there are a number of imaging modes that may be used with STM instrumentation. As an example, these modes include the constant current or topography imaging mode. Even within this imaging mode there is a wide parameter space including sample bias and set point current. To avoid doing depassivation while centering the tip, both the bias and current must be kept below a threshold. Variations in tip imaging conditions may impact the effectiveness of some imaging strategies, and automated adapting of the imaging strategies may prove useful. Also, the imaging of the Si surface is changed significantly when the Si is depassivated. While the centering on a pixel before exposure is performed on a pixel passivated with H atoms, often the pixels adjacent to the pixel to be exposed will have already been depassivated. The effect of these nearby dangling bonds on imaging of the pixel will also depend on the imaging resolution of the tip. The pixel centering method will have to take these effects into account. One option to avoid the effects of nearby dangling bonds is to center on a pixel that is not the one to shortly be exposed but to move a few pixels away and use a pixel centering method on that pixel. Once centered over the nearby pixel, then the short move back to the pixel that will be exposed can be done with a high degree of confidence.

In one exemplary method, the system 100 may apply a positive or negative bias voltage between the tip 104 and the sample 302 and image at least a portion of the pixel 318 by measuring the current and/or tip height at various positions over the pixel 318. In some examples, a full scan of the pixel 318 may be made to determine the center of the pixel 318, periodicity, angular alignment of the dimer row 310, and/or other measures of planar or angular alignment.

In some examples, a limited scan of a portion of the surface around the pixel 318 is performed to detect the pixel center and to determine when the tip 104 is centered over the pixel 318. For example, the system 100 may sense the tip current produced by a positive or negative bias at a number of locations within a small window corresponding to the pixel 318. Due to the atomic and electronic structure of the surface, there are local maxima and minima in the tip current at different locations within the pixel 318, which can be used to locate the tip with high precision within the pixel. A suitable sample bias, which may depend on the condition of the tip 104, is chosen which gives the strongest contrast between different locations within the pixel 318. In one example, with a negative imaging bias, a local maximum is associated with the center of a dimer along both the dimer and the dimer row axes, and a local minimum is associated with the center of a two-dimer pixel 318 in the axis along the dimer row 310. Accordingly, the control unit 114 may seek the center of a two-dimer pixel 318 by dithering the tip 104 in a direction perpendicular to the dimer row axis and while doing that, move the tip 104 more slowly in the direction along the dimer row axis until a local maximum in the average height is found. This locates the dither line (across the dimer row) centered on a dimer axis. The highest point in that dither line may be in the center of the dimer. Stopping the dither and positioning the tip 104 at the maximum point positions the tip in the center of one of the dimers in the pixel 318. Then, moving the tip 104 along the dimer row axis toward the center of the pixel 318, the center of the pixel 318 can be identified at the local maxima along that direction.

As the electronic structure of the surface depends on the sample bias chosen, different maxima and minima become available at different sample biases. Therefore, it may be advantageous for the imaging used to center the tip 104 may be performed using more than one sample bias voltage. In a hydrogen-terminated silicon example, in an empty-state image and using a positive sample bias, the dimer appears as two dots. This may be used to center the tip 104 within a dimer row 310, and in the example, the centering is performed using an imaging bias of about +2.5V. However, the pair of dots provides an indistinct landmark for centering along the dimer row axis. Accordingly, in the example, the tip 104 is aligned with the center of the row using the positive bias voltage, and then the bias voltage is transitioned to a negative bias voltage (e.g., about −2V) where the bond between the dimer atoms is imaged as an oval shape extending perpendicular to the row's longitudinal axis. This provides a more distinct landmark, and accordingly, the negative bias is used in the imaging procedure to locate the tip 104 between dimers along the dimer row axis.

In another example, after the first unexposed pixel 318 is centered on and exposed, the generally increased imaging contrast of the depassivated Si atoms provides a better method of locating the center of the pixel. In this approach, once the first pixel in a row of pixels to be exposed is patterned, then the tip 104 is moved open loop to the center of the next pixel, where such a short move is done accurately with significant confidence, and then the pixel exposed and the tip centered on the exposed pixel, before moving to the next pixel.

With the tip 104 centered over the pixel 318, the control unit 114 increases the bias voltage and current through the tip 104 in order to depassivate the pixel 318 as illustrated in block 212 of FIG. 2. This may switch the system 100 from an imaging mode used during blocks 204-210 into a lithography mode in blocks 212-216. Through the application of the bias voltage between the tip 104 and the sample 302, a current is generated between the tip 104 and the sample 302 that excites one or more of the atoms or molecules forming the resist layer (e.g., the H atoms 306 of FIG. 7). If the atom or molecule is sufficiently excited by the current, then the bond between the atom or molecule of the resist layer and the associated atom or molecule of the sample 302 (e.g., the Si atoms 304, omitted for clarity) will be broken and the released atom or molecule will desorb into the vacuum of the STM system 100.

The system may use either positive or negative bias between the sample 302 and the tip 104. At lower positive biases, the flow of electrons is primarily tunneling from the tip 104 to the sample 302 and the efficiency of hydrogen removal is dependent on the magnitude of the bias and on the current between the two. In more detail, in low bias lithography (e.g., using a positive bias voltage less than about 7V) successful exposure (i.e., depassivation) of the sample 302 depends not only on the accumulated dose of electrons, but also on the arrival rate or dose-rate of the electrons. Any one electron can excite the Si—H chemical bond but cannot by itself break it. In the meantime, other processes (e.g., phonon interactions) act against this excitation by moving the excited chemical bond back down to the ground state. In order to break the bond, the current must be sufficient to overcome the countervailing processes. Moreover as the cross-sectional area for the electrons to impart their energy to the Si—H is relatively small, most electrons leaving the tip 104 may not participate in exposure. As a result, it may take on the order of 105 to 109 electrons to cause a single H atom to desorb at these voltages. Below a certain dose rate (i.e., current), the resist will not be exposed (the Si—H bond will not be broken and the H atoms will not desorb) no matter how high the dose.

Furthermore, because the current is not evenly distributed across the surface of the sample 302, but falls off radially away from the point on the sample 302 directly under the tip 104, there is an exposure zone under the tip, the size of which depends on the tip 104, bias, the maximum current leaving the tip 104, and the tip speed across the sample 302. In the examples that follow, the bias voltage and the current are controlled so that the exposure zone accurately and reliably exposes a given pixel 318 without inadvertently exposing adjacent pixels 318 and while still providing ample margin for error in positioning of the tip 104. In some examples where the tip 104 scans across multiple pixels 318 while the voltage and current are applied in block 212, the exposure zone is sized to account for drift and other positioning errors along the scanning path of the tip 104.

In other examples, a discrete step-and-shoot process is performed where the tip 104 is positioned over a pixel 318 in blocks 208 and 210, and the voltage and current are raised in block 212 only after lateral movement of the tip 104 has ceased. Once the system 100 receives a signal that confirms that the pixel 318 has been patterned in block 214, the voltage and current are decreased in block 216, and the tip 104 is moved to the next pixel 318. Among other advantages, this allows the system 100 to better control the tip 104 location because the tip 104 is precisely recentered in block 210 prior to every exposure, regardless of tip changes, drift, miscalibration, and other errors, thereby compensating for these sources of errors and others. In some examples, if the positional errors are well contained within established tolerances, dead reckoning of multiple step-and-shoot exposures of pixels may be used between periodic recentering of the tip 104 in pixels. The number of step-and-shoot exposures may be adaptable depending on the amount of tip position error that is discovered in the pixel centering process.

In addition to reduced position error, the discrete step-and-shoot process may be more tolerant of such error as described with reference to FIG. 8, which is a diagrammatic schematic top view of the sample 302 having a lithographic exposure zone according to an embodiment of the present disclosure. As illustrated, the sample 302 includes a number of pixels 318. While the pixels 318 may include any number of dimers 308, in the illustrated examples, each pixel 318 includes two dimers 308. In the exemplary sample 302, the H atoms 306 of a dimer 308 are approximately 0.3 nm apart as indicated by marker 802. Neighboring H atoms 306 of different dimers 308 in the same dimer row 310 are approximately 0.384 nm apart as indicated by marker 804. Neighboring H atoms 306 in different dimer rows 310 are approximately 0.468 nm apart as indicated by marker 806.

An exposure zone 808 may be defined such that H atoms 306 within the zone are depassivated while atoms outside the zone are not. In more detail, the exposure zone 808 may be defined as a surface region over which the depassivation efficiency is within some threshold of the maximum efficiency, i.e., the efficiency at the point directly under the tip 104. Atoms outside the exposure zone 808 may not receive sufficient current to depassivate within a window of time or may not depassivate at all. In an example, the exposure zone 808 is defined as the region having at least about 1% of the maximum efficiency. In the above example, the minimum exposure zone radius in order to encompass and thereby expose all four H atoms 306 of a pixel 318 concurrently, indicated by marker 810, is 0.244 nm, although it is noted that this would leave no tolerance for tip position error.

Instead, the radius of the exposure zone 808 may be expanded to maximize the tolerances in each of the axes (e.g., x and y) so that the atoms of the pixel 318 do not fall outside of the exposure zone 808 (within-pixel tolerance) and so that the exposure zone 808 does not inadvertently depassivate a H atom 306 of a neighboring pixel 318 (neighboring-pixel tolerance). In the above example, the tolerances are maximized at an exposure zone radius of about 0.41 nm, which, for reference, provides a greater tolerance for positioning error than the optimal exposure zone for a scanning exposure and a greater tolerance for positioning error than the optimal exposure zone for a single dimer pixel. Thus, by setting the exposure zone radius 810 to expose an entire two-dimer pixel concurrently, the tolerance is actually greater than setting the exposure zone radius 810 to expose a single dimer pixel.

Having determined a desired exposure zone radius 810, the corresponding voltage and tip current used to produce an exposure zone 808 with the desired radius 810 may be determined. The current distribution on the surface of the sample 302 may be modeled using a model such as the following:

$$i = KVe^{-\frac{2Td\sqrt{2mWF}}{hbar}}$$

$$Td = \sqrt{(d + Rt)^2 + Lr^2} - Rt$$

where i represents current, K represents a tip and material dependent constant, V represents the sample bias, m represents electron mass, WF represents a local barrier height for electron tunneling between the tip and sample, hbar represents the reduced Planck's constant, d represents a tip to sample distance, Rt represents a tip radius, and Lr represents a lateral distance to a tunneling point on the sample.

From such a model, the current distribution and magnitude can be determined based on bias voltage, tip height, and other system parameters. A number of other models exist to determine the amount of current used to break an Si—H bond and depassivate a pixel of the sample 302. For example, according to Foley, E. T., et al., "Cryogenic UHV-STM Study of Hydrogen and Deuterium Desorption from Si(100)," Phys. Rev. Lett., Vol. 80, 1336 (1998), which is herein incorporated by reference, the depassivation efficiency (H/e) is approximately:

$$\frac{H}{e} = 2^{-11} i^8$$

where i represents current. Other models have determined that the efficiency is proportional to current raised to a power between about 8.45 and about 9.4. In either case, the effective exposure efficiency falls off rapidly away from the point of the sample 302 directly aligned with the tip 104. In one example, current at a radial distance of 0.5 nm is reduced by one order of magnitude, while the depassivation efficiency is reduced by approximately 8 orders of magnitude at the same distance. In other words, the exposure efficiency falls off dramatically with radial distance, which provides the benefit of a very abrupt exposure zone. See also Chen, S., et al., "Patterning of sub-1 nm dangling-bond lines with atomic precision alignment on H:Si(100) surface at room temperature," Nanotechnology, Vol. 23, No. 27, 275301 (2012), which is herein incorporated by reference.

For comparison, whereas the depassivation efficiency in the above STM lithography example is reduced 8 orders of magnitude at a radial distance of 0.5 nm, a comparable e-beam exposure technique may produce a dose that is reduced a single order of magnitude at a radial distance of 4 nm. In other words, the exposure zone 808 of the STM lithographic technique is much smaller than the e-beam and has a sharper transition.

In discrete step-and-shoot examples, the height of the tip 104 above the surface of the sample 302 during blocks 212-216 may be reduced because the tip control is not complicated by lateral movement of the tip 104. Moving the tip 104 closer to the sample 302 may increase tip current at a given bias voltage. In an example, the tip 104 is located about 5% closer to the sample 302 in a step-and-shoot example than in a scanning example, resulting in a current directly under the tip that is 2.5 times greater. Because of the strong dependency on radial distance, the increased tip current and the correspondingly larger exposure zone produce a current at the optimal location of the H atoms 306 that is almost 20 times greater in the step-and-shoot example. In turn, the larger current may break the Si—H bonds faster, resulting in an exposure that is almost 50 times faster than the scanning example. As a result, the overall step-and-shoot patterning technique may be significantly faster than continuous scanning examples, even accounting for the additional time to position the tip 104 between exposures.

As one final advantage, in the discrete step-and-shoot examples, during the time that the voltage and current are applied in blocks 212-216, a control feedback loop that automatically adjusts the height of the tip 104 in response to changes in current may be turned off. In the imaging mode used in blocks 202-210 and elsewhere, the feedback loop may cause the tip 104 to rise and fall in response to changes in current caused by the topography of the atoms on the surface of the sample 302 to prevent tip crashes. Because it is current dependent, the feedback loop may also cause the tip 104 to move due to changes in local barrier height due to depassivation and to noise in the current signal.

During block 212, the feedback loop may be unnecessary because the tip is not moving, and the chance for crashes may already be low. If the feedback loop is left on, it may be triggered by a rapid change in tip current from the desorption of H atoms when the Si—H bonds are broken. The feedback loop may respond to the increase in current by retracting the tip, which may reduce the exposure current and impair the depassivation of other atoms in the pixel 318. In contrast, turning off the feedback loop may avoid inadvertent tip retraction. By deactivating the tip height feedback loop, the step-and-shoot examples may provide better current control than comparable scanning examples.

Referring to block 214, the control unit 114 monitors the tip current and other signals to detect when the pixel 318 has been depassivated and H atoms have been removed. Desorption can be detected by an increase in tunneling current due to the decreased local barrier height of clean silicon compared to hydrogen-passivated silicon. Accordingly, in an example, the system 100 monitors the tip current for rapid and sustained changes in the current due to the desorption of an H atom. In examples where an exposure removes more than one H atom (e.g., a 4H atom pixel), the number of atoms removed may be determined based on the magnitude of a change in current, the duration of such a change, the linearity of the current (as the bias ramps up), the number of discrete current events such as spikes, and/or other aspects of the current. Other properties or events such as an abrupt change in local barrier height may also be considered. In contrast to methods that blindly sweep the tip 104 along the sample 302 during depassivation, the present system 100 may provide a more controlled and precise dose and thereby reduce the risk of depassivating adjacent pixels 318 by monitoring for depassivation events and ramping down the voltage and/or current once depassivation has been achieved.

Referring to block 216, when the control unit 114 detects a signal that indicates that the pixel 318 has been fully depassivated, the control unit 114 ramps down the voltage and/or current to prevent further depassivation. In some examples, the system 100 adjusts the factor with the most rapid response first in order to quickly cease lithography. In one such example, the system 100 adjusts the bias voltage before adjusting tip height to stop lithography because the bias voltage can be changed more rapidly and has a more rapid effect on tip current than changing the height of the tip.

The system 100 may verify that the pixel 318 has been fully depassivated either immediately after exposing the pixel 318 or may return to verify the pixel 318 after a region of multiple pixels 318 has been exposed. In an example of the former, referring to block 218, the control unit 114 returns the system 100 to an imaging mode to verify that the current pixel 318 has been fully depassivated.

In some examples, the control unit 114 verifies that the pixel 318 has been depassivated by applying a positive or negative sample bias (e.g., −2V) that is less than the exposure bias of block 212 and measuring the sustained tip current with the tip 104 over the center of the pixel 318. As depassivation may reduce the local barrier height and increase the corresponding current, a tip current that exceeds a threshold may indicate that the pixel 318 has been successfully depassivated. This may be performed without the use of the tip height feedback loop.

In some examples, the control unit 114 verifies that the pixel 318 has been depassivated by applying a positive or negative sample bias that is less than the exposure bias of block 212 and by horizontally dithering the tip 104. Tip current that rises or stays the same as the tip 104 approaches the region of a potential Si—H bond may indicate that the hydrogen has been removed, while tip current that falls may indicate that the Si—H bond is still present and the pixel 318 has not yet been fully depassivated. The horizontal dithering of the tip 104 may involve significantly less horizontal motion than a full raster scan of the pixel 318 as the tip 104 may move only part way between the center of the pixel 318 and each potential Si—H bond. This may be performed without the use of the tip height feedback loop.

In some examples, the control unit 114 verifies that the pixel 318 has been depassivated by applying a positive or negative sample bias that is less than the exposure bias of block 212 with the tip height feedback loop active and measuring the tip 104 height with the tip 104 over the center of the pixel 318. As the tip height is related to the local barrier height, a tip height that is greater than a threshold may indicate that the pixel 318 has been fully exposed.

In some examples, the control unit 114 verifies that the pixel 318 has been depassivated by measuring the local barrier height to see if it has been reduced beyond a given threshold. In some such examples, the control unit 114 applies a positive or negative sample bias that is less than the exposure bias of block 212 with the tip 104 over the center of the pixel 318. With the tip height feedback loop active, the control unit 114 changes the current set point of the tip height feedback loop and measures the corresponding changes in the tip height to determine the local barrier height.

In some examples, the control unit 114 verifies that the pixel 318 has been depassivated by measuring the bandgap of the sample within the pixel 318. If a dimer of a pixel 318 is fully depassivated and all H atoms are removed, the dimer may display a particular bandgap. In contrast, if the dimer has one or more Si—H bonds, the dimer may have little or no bandgap. In some such examples, the control unit 114 applies a positive or negative sample bias that is less than the exposure bias of block 212 with the tip 104 over the center of the pixel 318. The control unit 114 changes the applies bias and measures the corresponding change in current to determine the bandgap. This may be performed without the use of the tip height feedback loop.

In some examples, the control unit 114 performs imaging spectroscopy over at least a subset of the pixel 318 to measure the corresponding bandgap to verify that the pixel 318 has been fully depassivated. In some such examples, the control unit 114 applies a positive or negative sample bias that is less than the exposure bias of block 212. With the tip height feedback loop active, the control unit 114 may move the tip 104 across the pixel 318 and measure the corresponding tip height and/or current to determine whether the pixel 318 has been successfully exposed. This may include a full raster scan of the pixel 318 or a small dithering movement that scans only the central portion of the pixel 318 because the topology of the Si—H bond can be measured some distance from the actual bond.

In some examples, the control unit 114 compare the tip height before and after the imaging to verify that the pixel 318 has been fully depassivated. In some such examples, the control unit 114 applies a positive or negative imaging sample bias similar to what was applied in block 210. If the tip height feedback loop was turned off in block 212, it may be reactivated for block 218. The feedback loop adjusts the height of the tip 104 in response to the tip current, and because depassivation may cause the tip current at a given bias voltage to be greater, depassivation can be verified by the difference in tip height being greater than a threshold (e.g., about 0.7 nm). If the control unit determines that a pixel 318 was not fully depassivated, the processes of blocks 212-216 may be repeated.

Referring to block 220, the control unit 114 determines whether there are other pixels 318 to depassivate in the write field 602. If so, the system returns to block 208, where the system 100 utilizes uses the fine motion actuators to move of the tip 104 (indicated by marker 702) of the STM 100 directly over the next pixel 318 of the write field 602 to be patterned.

If verification of depassivation was not performed in block 218, the control unit 114 may return the tip 104 to the start of the write field 602 and perform verification on the exposed pixels 318 of the write field 602 as illustrated in block 222. Verification may be performed substantially as described in block 218. If the control unit determines that a pixel 318 was not fully depassivated, the processes of blocks 212-216 may be repeated.

Once there are no more pixels 318 to depassivate in the write field, referring to block 224, the control unit 114 determines whether there are other pixels 318 to depassivate in other write fields 602. If so, the system 100 returns to block 208, where the control unit 114 uses the coarse and/or fine motion actuators to move of the tip 104 of the STM proximate to the next write field 602. Once all designated pixels 318 in all write fields 602 have been depassivated, the method 200 may complete in block 226 by providing the sample 302 for further fabrication.

In this way, the present technique provides a system and a technique for forming atomically precise patterns in the sample. In some embodiments, the method of patterning a surface includes receiving a sample having a surface to be patterned. A conductive tip of a scanning tunneling microscope is positioned over a pixel region of the surface. While the conductive tip remains laterally fixed relative to the surface, a bias voltage is applied between the conductive tip and the surface such that a current between the conductive tip and the surface removes at least one atom from the pixel region. It is verified that the at least one atom has been removed from the pixel region. In some such embodiments, the conductive tip is moved to a second pixel region after verifying that the at least one atom has been removed from the first pixel region. Thereafter and with the conductive tip laterally fixed relative to the surface, the bias voltage is applied between the conductive tip and the surface again such that the current of the conductive tip removes at least one atom from the second pixel region. In some such embodiments, the surface includes a plurality of dimers, and each dimer includes a plurality of atoms of hydrogen and a plurality of atoms of silicon. In some such embodiments, each pixel region includes at least two dimers.

In further embodiments, the lithographic system includes a conductive tip, a motion control system coupled to the conductive tip and configured to control a position of the conductive tip relative to a sample, and a control unit coupled to the motion control system and to the conductive tip. The control unit is configured to align a grid of pixels to a crystalline structure of a surface of the sample; position the conductive tip over a first pixel of the grid of pixels; with the conductive tip fixed over the first pixel, apply an exposure bias voltage between the conductive tip and the surface; and verify that a current resulting from the exposure bias voltage has removed at least one atom from the first pixel. In some such embodiments, the control unit is further configured to adjust a distance between the conductive tip and the sample in response to a current signal and to inhibit adjustment of the distance in response to the current resulting from the exposure bias voltage. In some such embodiments where the first pixel includes a plurality of dimers, the control unit is further configured to determine a magnitude of the current to produce an exposure zone on the surface sized to cover the plurality of dimers of the first pixel.

In yet further embodiments, the non-transitory machine-readable medium stores instructions that, when executed by a processing resource, cause the processing resource to: determine an orientation of a crystalline structure of a sample; align a grid of pixels to the crystalline structure; position a conductive tip over a first pixel of the grid of pixels; with the conductive tip in a fixed position over the first pixel, apply an exposure bias voltage between the conductive tip and the sample; and verify that an exposure current resulting from the exposure bias voltage has removed at least one atom from the first pixel. In some such embodiments, the non-transitory machine-readable medium stores further instructions that cause the processing resource to monitor for a signal indicating removal of the at least one atom from the first pixel and to reduce the exposure current in response to the signal indicating removal of the at least one atom from the first pixel. In some such embodiments, the signal is a change in the exposure current resulting from the exposure bias voltage. In some such embodiments, the signal is based on a property of the exposure current from a group consisting of: a magnitude of a change in the exposure current, a duration of a change in the exposure current, linearity of the exposure current, and a count of changes in the exposure current. In some such embodiments, the signal is based on a local barrier height of the first pixel. In some such embodiments, the instructions that reduce the exposure current include further instructions to: reduce the exposure bias voltage between the conductive tip and the sample; and thereafter increase a distance between the conductive tip and a surface of the sample.

Those of ordinary skill in the art will also recognize that the methods and systems described above can be modified in various ways. Accordingly, those of ordinary skill in the art will appreciate that the embodiments encompassed by the present disclosure are not limited to the particular exemplary embodiments described above. In this regard, while illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method of patterning a surface, the method comprising:
    receiving a sample having a surface to be patterned;
    in an imaging mode associated with a first bias and a first current between a conductive tip and the surface, positioning the conductive tip of a scanning tunneling microscope over a pixel region of the surface, wherein the pixel region includes a plurality of dimers, each dimer including a first plurality of atoms of a first element passivated with a second plurality of atoms of a second element;
    in a lithography mode associated with a second bias and a second current between the conductive tip and the surface, while the conductive tip remains laterally fixed relative to the surface, applying the second bias between the conductive tip and the surface such that the second current between the conductive tip and the surface removes a plurality of passivating atoms from a fixed exposure zone in the pixel region, wherein at least one of the first bias or the first current is different from a respective one of the second bias or the second current; and
    detecting a signal indicating depassivation of the pixel region.

2. The method of claim 1, wherein the first element includes at least one of silicon, germanium, or carbon and the second element includes at least one of hydrogen or chlorine.

3. The method of claim 1, wherein the second current is configured to debond the plurality of passivating atoms of the second element from the plurality of dimers of the pixel region.

4. The method of claim 1, wherein the scanning tunneling microscope includes a control mechanism to adjust a distance between the conductive tip and the surface, the method further comprising disabling the control mechanism during the applying of the second bias such that the distance between the conductive tip and the surface does not change in response to at least one of:
    a change in the second current; or
    the removal of the plurality of passivating atoms.

5. The method of claim 1 further comprising determining a magnitude of the second current such that the second current between the conductive tip and the surface produces the fixed exposure zone on the surface sized to expose an entirety of the pixel region concurrently.

6. The method of claim 5 further comprising determining a distance between the conductive tip and the surface configured to produce the determined magnitude of the second current.

7. The method of claim 5 wherein the exposure zone is further sized to maximize a within-pixel tolerance such that all of the passivating atoms of the pixel region are within the fixed exposure zone and such that no passivating atoms of a neighboring-pixel region are within the fixed exposure zone.

8. The method of claim 1, wherein the signal is a change in the second current between the conductive tip and the sample.

9. The method of claim 1, wherein the signal is based on a property of the second current between the conductive tip and the sample from a group consisting of: a magnitude of a change in the second current, a duration of change in the second current, linearity of the second current with respect to bias changes, linearity of the second current with respect to height changes, and a count of changes in the second current.

10. The method of claim 1, wherein the signal is based on a local barrier height of the pixel region.

11. The method of claim 1, wherein the positioning of the conductive tip over the pixel region includes at least one of:
    applying a first imaging bias between the conductive tip and the sample and performing a seek procedure to find a tip position associated with a minimum tip height and corresponding to a center of the pixel region; or
    imaging the pixel region to locate the center of the pixel region.

12. The method of claim 1, further comprising:
    returning to the imaging mode, verifying that the plurality of passivating atoms has been removed from the pixel region.

13. The method of claim 12, wherein the pixel region is a first pixel region, the method further comprising:
    moving the conductive tip to a second pixel region after the detecting of the signal and the verifying that the plurality of passivating atoms has been removed from the first pixel region; and
    thereafter, while the conductive tip remains laterally fixed relative to the surface, applying the second bias between the conductive tip and the surface such that the second current of the conductive tip removes a further plurality of passivating atoms from the second pixel region.

14. The method of claim 12 further comprising reducing at least one of the second current or the second bias between the conductive tip and the sample in response to the signal indicating depassivation of the pixel region prior to the verifying that the plurality of passivating atoms has been removed from the pixel region.

15. The method of claim 12, wherein the verifying that the plurality of passivating atoms has been removed from the pixel region includes:
applying an imaging bias voltage between the conductive tip and the surface;
measuring a post-exposure tip height in response to an imaging current produced by the imaging bias voltage; and
comparing the post-exposure tip height to a pre-exposure tip height obtained before removal of the plurality of passivating atoms from the pixel region.

16. The method of claim 12, wherein the verifying includes measuring a local barrier height of the pixel region.

17. The method of claim 12, wherein the verifying includes measuring a bandgap for the pixel region.

18. A lithographic system comprising:
a conductive tip;
a motion control system coupled to the conductive tip and configured to control a position of the conductive tip relative to a sample;
a control unit coupled to the motion control system and to the conductive tip, wherein the control unit is configured to:
align a grid of pixels to a crystalline structure of a surface of the sample, wherein each pixel includes a plurality of dimers, each dimer including a first plurality of atoms of a first element passivated with a second plurality of atoms of a second element;
in an imaging mode associated with a first bias and a first current between the conductive tip and the surface, position the conductive tip over a first pixel of the grid of pixels;
in a lithography mode associated with a second bias and a second current between the conductive tip and the surface, with the conductive tip fixed over the first pixel, apply the second bias between the conductive tip and the surface such that the second current between the conductive tip and the surface removes a plurality of passivating atoms from a fixed exposure zone in the first pixel, wherein at least one of the first bias or the first current is different from a respective one of the second bias or the second current; and
detect a signal that indicates removal of the plurality of passivating atoms from the first pixel.

19. The lithographic system of claim 18, wherein the control unit is further configured to:
adjust a distance between the conductive tip and the sample in response to a current signal; and
inhibit adjustment of the distance in response to at least one of:
a change in the second current resulting from the second bias or
the removal of the plurality of passivating atoms.

20. The lithographic system of claim 18, wherein the control unit is further configured to determine a magnitude of current to produce the fixed exposure zone on the surface sized to cover the plurality of dimers of the first pixel.

21. The lithographic system of claim 18, wherein the control unit is further configured to:
in the imaging mode, verify that the second bias has removed the plurality of passivating atoms from the first pixel.

22. The lithographic system of claim 21, wherein the control unit is further configured to:
move the conductive tip from the first pixel to a second pixel of the grid of pixels after removal of the plurality of passivating atoms from the first pixel has been verified;
with the conductive tip fixed over the second pixel, reapply the second bias between the conductive tip and the surface; and
verify that the second bias has removed a further plurality of passivating atoms from the second pixel.

\* \* \* \* \*